US006666062B2

(12) United States Patent
Dole et al.

(10) Patent No.: US 6,666,062 B2
(45) Date of Patent: Dec. 23, 2003

(54) PIPE PREPARATION DEVICE

(75) Inventors: Douglas R. Dole, Whitehouse Station, NJ (US); Vance W. Henry, Easton, PA (US)

(73) Assignee: Victaulic Company of America, Easton, PA (US)

( * ) Notice: Subject to any disclaimer, the term of this patent is extended or adjusted under 35 U.S.C. 154(b) by 17 days.

(21) Appl. No.: 09/907,018

(22) Filed: Jul. 17, 2001

(65) Prior Publication Data

US 2002/0007514 A1 Jan. 24, 2002

Related U.S. Application Data

(60) Provisional application No. 60/262,819, filed on Jan. 19, 2001, and provisional application No. 60/218,770, filed on Jul. 17, 2000.

(51) Int. Cl.[7] .................................................. B21D 3/02
(52) U.S. Cl. ........................... 72/121; 72/102; 72/118; 72/123; 72/125
(58) Field of Search .......................... 72/112, 115, 116, 72/118, 120, 121, 122, 123, 124, 125, 399, 400, 402, 403, 102, 105, 106

(56) References Cited

U.S. PATENT DOCUMENTS

| 2,975,819 A | 3/1961 | Costanzo et al. ............... 153/9 |
|---|---|---|
| 3,015,502 A | 1/1962 | Frost et al. .................. 285/112 |
| 3,071,993 A | 1/1963 | Foster, Sr. et al. ............... 81/15 |
| 3,283,553 A | * 11/1966 | Taylor .......................... 72/116 |
| 3,473,359 A | * 10/1969 | Joslin .......................... 72/121 |
| 3,748,933 A | 7/1973 | DeShazor ........................ 82/4 |
| 3,867,824 A | * 2/1975 | Takagi et al. .................. 72/118 |
| 3,903,722 A | 9/1975 | Thau, Jr. et al. ............... 72/105 |
| 3,985,051 A | 10/1976 | Brown .......................... 82/101 |
| 3,995,466 A | 12/1976 | Kunsman ...................... 72/106 |
| 4,279,181 A | * 7/1981 | Birkestrand .................. 72/121 |
| 4,794,775 A | 1/1989 | Kuwahara et al. ............. 72/78 |
| 4,873,856 A | * 10/1989 | King ........................... 72/121 |
| 5,329,797 A | * 7/1994 | Calhoun ....................... 72/121 |

FOREIGN PATENT DOCUMENTS

JP          11-207411          8/1999          .......... B21D/17/04

* cited by examiner

Primary Examiner—Ed Tolan
(74) Attorney, Agent, or Firm—Synnestvedt & Lechner LLP

(57) ABSTRACT

A device for preparing pipe segments for joining with mechanical pipe fittings in a piping network is disclosed. The device has a fixed support with support surfaces engageable with the pipe segment, and a movable support, facing the fixed support, on which tools, such as grooving rolls, chamfering rolls, marking rolls and cutting blades are rotatably mounted. The tools engage the outer surface of the pipe to form a circumferential groove, a marking pattern, a chamfer or a cut through the pipe when the movable support is moved toward the fixed support. A collar or cup having a circumferential side wall sized to receive the pipe is mounted on the fixed support adjacent to the support surfaces and radially reinforces the pipe to prevent it from collapsing or going out of round during groove formation.

42 Claims, 12 Drawing Sheets

FIG.II

PIPE PREPARATION DEVICE

RELATED APPLICATIONS

This application is based upon and claims the benefit of prior filed co-pending Provisional Application No. 60/218,770, filed Jul. 17, 2000, and Provisional Application No. 60/262,819 filed Jan. 19, 2001.

FIELD OF THE INVENTION

This invention concerns a device for preparing pipe segments for joining with pipe couplings or fittings. The device mounts tools for performing such functions as impressing a circumferential groove in a surface of a pipe, marking the surface of the pipe, chamfering the end of the pipe and cutting the pipe.

BACKGROUND OF THE INVENTION

The preparation of pipe segments for connecting to fittings or couplings in a piping network often requires that the pipe be cut, a circumferential groove be formed on a surface of the pipe, the pipe surface be marked at a particular location and that the cut end of the pipe be chamfered to remove burrs or sharp edges resulting from the cutting process. Marking the surface is useful to provide a visual indicator for the proper engagement depth of the pipe in a fitting. Circumferential grooves are often used to provide a locating feature for positioning a sealing means such as an O-ring or gasket, as well as a surface feature for mechanically engaging a coupling to increase the axial pull-out strength of a pipe joint. Cutting is of course necessary to trim pipe stock to a desired length, and chamfering deburrs the cut end and provides a beveled surface which facilitates the entry of the pipe into a fitting.

Forming circumferential grooves in pipes made of malleable materials such as copper, steel and aluminum is accomplished by cold working the metal beyond its yield stress, thereby causing a permanent deformation in the metal. Existing techniques for forming circumferential grooves in metal pipes entail sandwiching the pipe wall between the circumferences of two adjacent rolls or wheels, one wheel being positioned on the inside of the pipe and the other on the outside. One of the wheels has a concave die around its outer circumference into which the circumference of the other wheel can interfit. When the wheels are rotated in opposite directions and sufficient pressure is applied tending to force the wheels together, the pipe wall yieldingly deforms under the pressure of the wheels to form a groove defined by the interaction of the pipe wall with the wheel circumference and the concave die.

The two-wheel method is effective at forming grooves in pipe walls while maintaining the roundness of the pipe because the pipe wall is mutually supported between the wheels and is never subjected to compressive point loads which would tend to collapse the pipe or force it out of round. However, the two wheel method is difficult to implement manually and is of limited value when applied to pipes of relatively small diameter since the inside wheel must be supported on a cantilever which extends into the pipe. Since the cantilever support must fit within the pipe, its physical size and consequently its bending stiffness are limited. For long cantilever lengths or small diameter pipes, the inside wheel may not have a stiff enough mounting to apply sufficient force in reaction to the outside wheel to effect deformation of the pipe wall beyond the yield point.

In addition, existing techniques tend to produce grooves which are concentric with the pipe inside surface. This results in non-uniform groove depths when the pipe wall is of a non-uniform thickness around its circumference. Non-uniform groove depth can degrade the performance of mechanical couplings which interface with the groove to effect the pipe joint.

Pipe cutting is often accomplished by engaging a cutting blade progressively with the pipe while the pipe is supported opposite the blade. As the blade engages the pipe, the pipe and blade are rotated relatively to one another about the longitudinal axis of the pipe until the cut is complete. Chamfering of the cut end may be accomplished by rotating a chamfering wheel or roll around the pipe against the cut end to cold work the metal and bevel the end. Marking of the pipe may be accomplished similarly to grooving the pipe or by rotating an imprinting wheel or a gravure wheel around the circumference.

Pipe preparation, thus, may require cutting, chamfering, grooving and marking. For small diameter pipes as described above, pipe grooving is not readily accomplished by existing means, be they manual or automated. Furthermore, when multiple functions must be performed to prepare a pipe, each function is generally performed with a single dedicated device. Thus, multiple devices are required. This is inefficient when it is necessary to perform multiple functions, as the operator must take the time to engage and disengage the pipe with each device in turn in the processing of the pipe. The inefficiencies are compounded when large numbers of pipe are to be processed. There is clearly a need for a single device which can effectively groove small diameter pipe as well as a device which can perform several or all of the functions required to prepare pipe for joining in a piping network and thus avoid the inefficiencies associated with the use of multiple single function devices.

SUMMARY OF THE INVENTION

The invention concerns a device for performing at least one of a plurality of operations on a pipe having a longitudinal axis and an outer circumferential surface. The device according to the invention has a first support with a support surface engageable with the outer circumferential surface of the pipe. A second support is positioned in spaced relation to the first support. One of the supports is movable toward and away from the other.

A tool is mounted on the second support and is positioned facing the first support. The tool is engageable with the outer circumferential surface of the pipe when the pipe is supported on the first support. The tool may be a grooving surface, a marking surface, or a chamfering surface. The plurality of operations which the device may accomplish includes forming a circumferential groove around the pipe with the grooving surface, forming a reference mark circumferentially around the pipe with the marking surface and chamfering the outer surface of the pipe with the chamfering surface. The tool and the pipe are rotatable relatively to one another around the longitudinal axis to effect the operation.

In another embodiment, the device performs a plurality of operations substantially concurrently on a pipe. This embodiment also has a first support with a support surface engageable with the outer circumferential surface of the pipe and a second support positioned in spaced relation to the first support. Again, one of the supports is movable toward and away from the other. A first tool comprising a grooving surface is preferably mounted on the second support and is positioned facing the first support. The grooving surface is engageable with the outer circumferential surface of the pipe when the pipe is supported on the first support. A second tool is also mounted on the second support and is also positioned facing the first support. The second tool is engageable with the outer circumferential surface of the pipe substantially concurrently with the first tool. The second tool may be a marking surface, a radiusing surface, a chamfering surface or a cutting blade, and the plurality of operations performed by the device include forming a circumferential groove around the pipe with the grooving surface, forming a reference mark circumferentially around the pipe with the marking surface, radiusing or chamfering the outer surface of the pipe with the radiusing or chamfering surface, and cutting the pipe with the cutting blade. To effect the operations, the first and the second tools and the pipe are rotatable relatively to one another around the longitudinal axis of the pipe.

In yet another embodiment of the invention, the device has a first support with a support surface engageable with the outer circumferential surface of the pipe and a second support positioned in spaced relation to the first support. One of the supports is again movable toward and away from the other.

The device also has a plurality of tools mounted on the second support and positioned facing the first support. The tools are all engageable substantially concurrently with the outer circumferential surface of the pipe when the pipe is supported on the first support. Preferably, the tools include a grooving surface, a marking surface, a chamfering surface and a cutting blade. The plurality of operations performed concurrently by the device include forming a circumferential groove around the pipe with the grooving surface, forming a reference mark circumferentially around the pipe with the marking surface, chamfering the outer surface of the pipe with the chamfering surface and cutting the pipe with the cutting blade. The tools and the pipe are rotatable relatively to one another around the longitudinal axis of the pipe to effect the plurality of operations.

It is an object of the invention to provide a device for efficiently preparing pipe segments for joining with mechanical fittings.

It is another object of the invention to provide a device which can be used on pipe of relatively small diameter.

It is yet another object of the invention to provide a device which can form grooves in a pipe without the use of a support contacting the inside surface of the pipe.

It is again another object of the invention to provide a device which can form grooves of uniform depth in a pipe relatively to the outside surface of the pipe.

It is still another object of the invention to provide a device which can perform multiple functions substantially concurrently on a pipe.

It is yet another object of the invention to provide a device which is adaptable for manual or automatic operation.

It is another object of the invention to provide a device which has interchangeable components and is adaptable to pipes of different diameters and materials.

These and other objects and advantages of the invention will become apparent from a consideration of the following drawings and detailed description of the preferred embodiments.

DETAILED DESCRIPTION OF PREFERRED EMBODIMENTS

Figure 1:
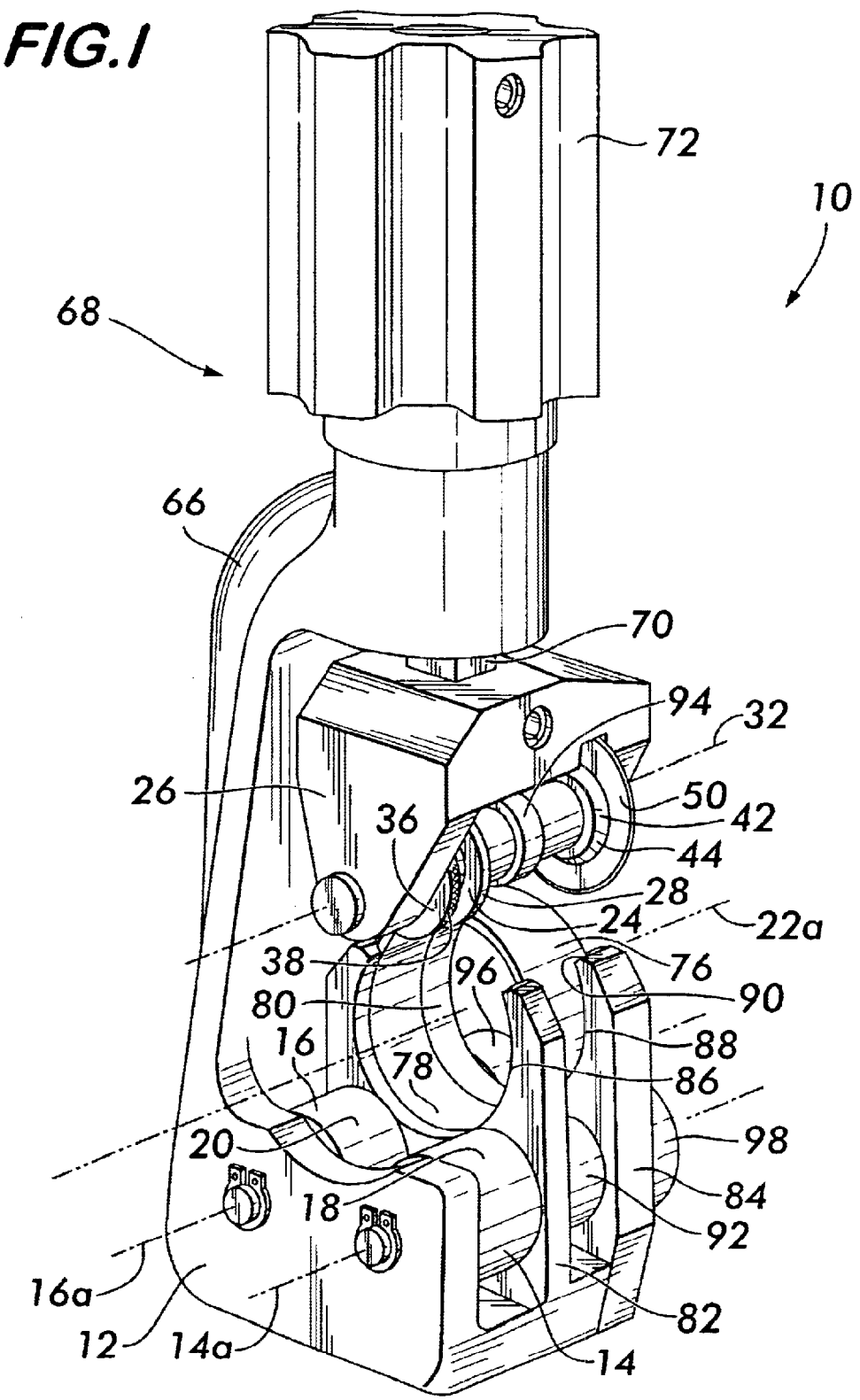
FIG. 1 is a perspective view of a multi-function embodiment of the pipe preparation device according to the invention.

FIGS. 1 through 4 show a multi-function embodiment of a pipe preparation device 10 according to the invention. Device 10 has a support 12 preferably including a pair of rollers 14 and 16 rotatably mounted thereon. Rollers 14 and 16 are positioned on support 12 in spaced relation to one another and have circumferential surfaces 18 and 20 which form support surfaces for receiving and supporting a pipe 22 shown in broken line in FIG. 2. Each roller is rotatable about a respective axis 14a and 16a oriented substantially parallel to the longitudinal axis 22a of pipe 22.

Figure 2:
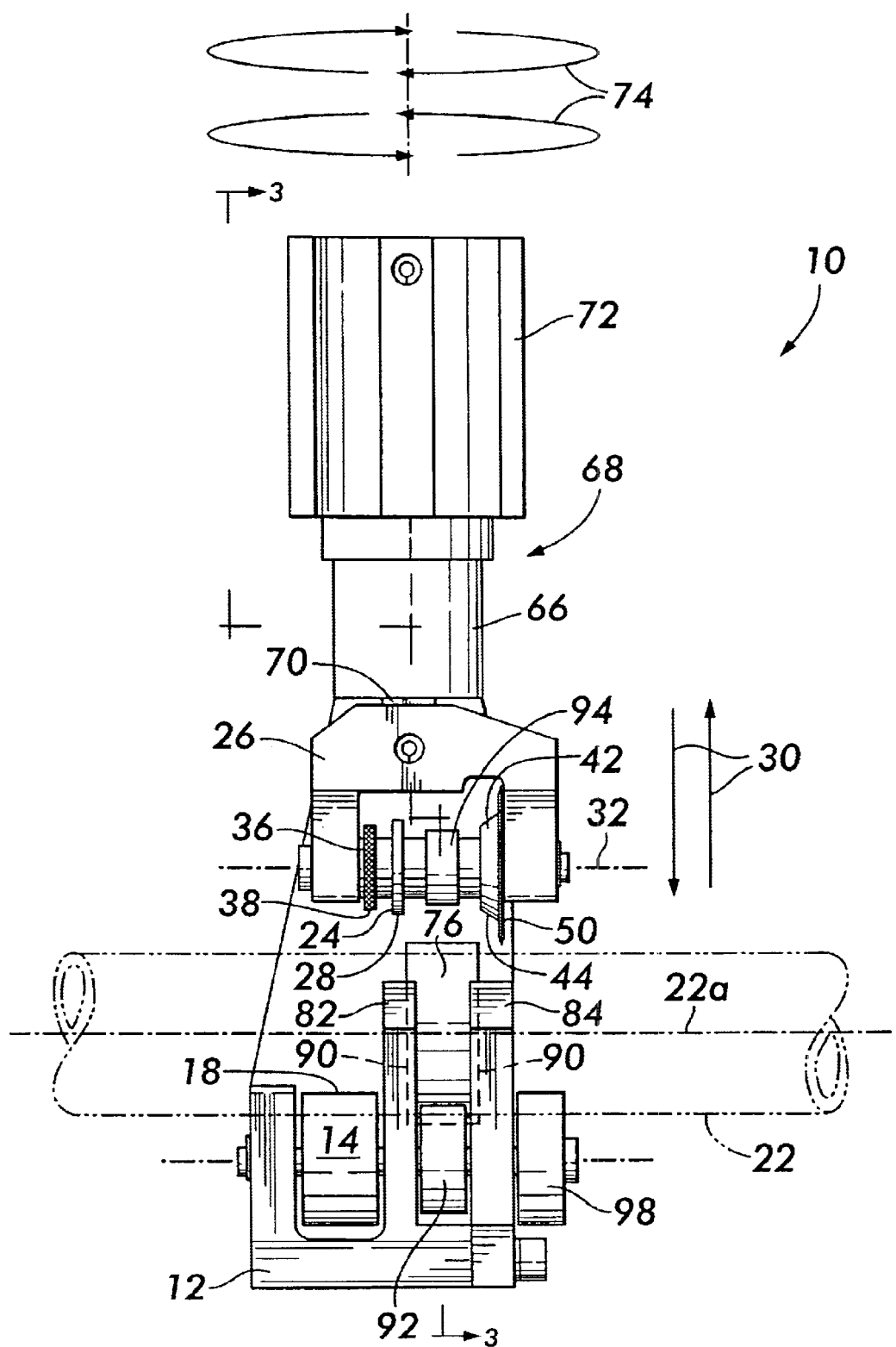
FIG. 2 is a side view of the device shown in FIG. 1.
Figure 3:
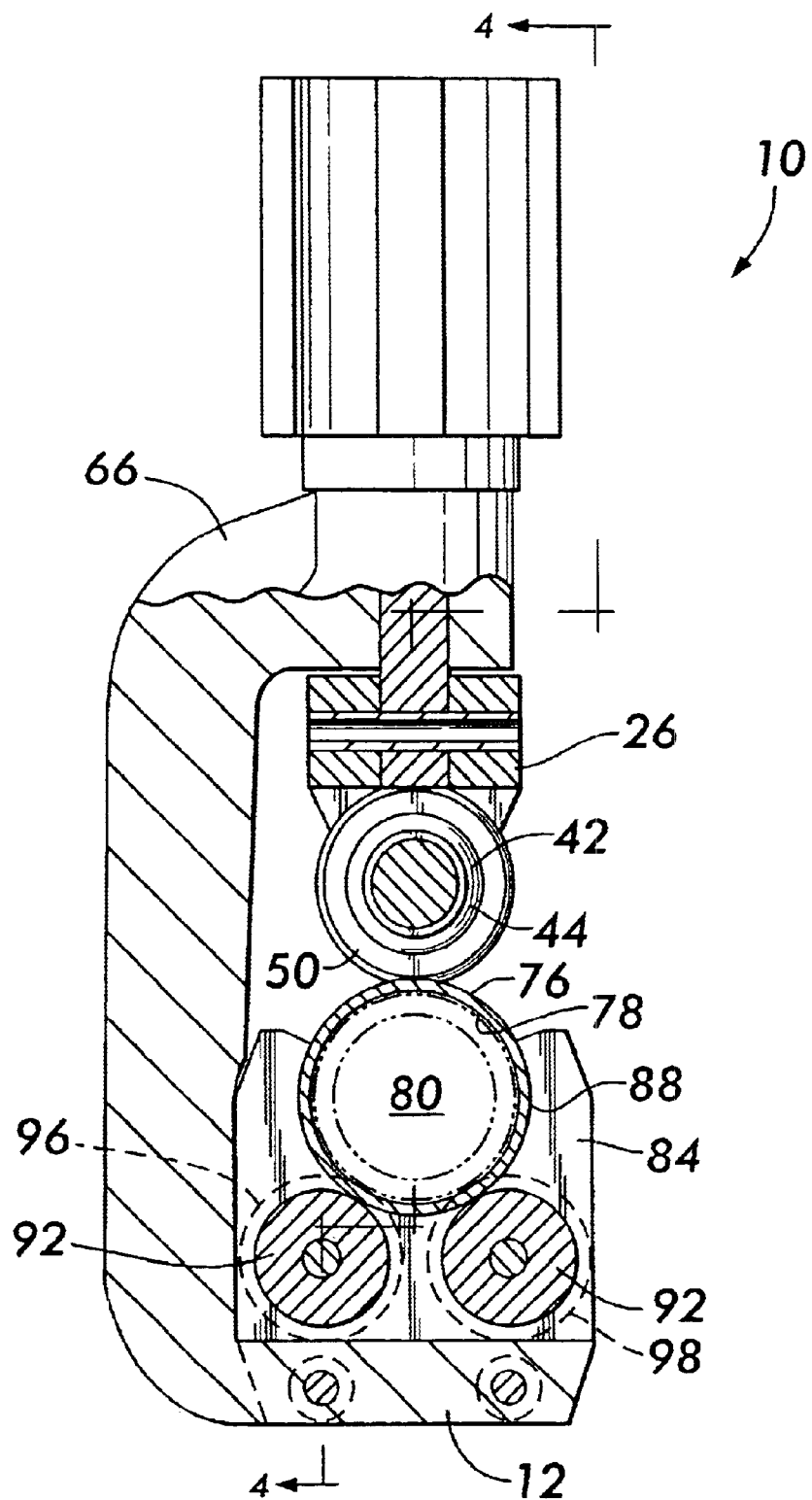
FIG. 3 is a sectional view taken along lines 3—3 of FIG. 2.

As shown in FIG. 2, a tool, preferably a grooving roll 24, is positioned on a second support 26 positioned in spaced relation to support 12. Grooving roll 24 is positioned facing support 12 and has a circumferential grooving surface 28. Grooving roll 24 is preferably rotatably mounted on support 26 which is movable toward and away from support 12 in the direction shown by double arrows 30 by means described below. (The invention would also work if support 26 were fixed and support 12 moved relatively to it.) Preferably, grooving roll 24 rotates about an axis 32 substantially parallel to the longitudinal axis 22a of pipe 22. When pipe 22 is received on the support surfaces 18 and 20 of rollers 14 and 16, support 26 is moved toward the support 12 to forcibly engage the grooving surface 28 with the pipe 22. A circumferential groove 34, best shown in FIG. 5, may then be formed in pipe 22, either by rotating the pipe relatively to the tool or the tool relatively to the pipe, such that the grooving surface 28 of grooving roll 24 traverses the circumference of the pipe 22 about the pipe's longitudinal axis 22a. The grooving surface is harder than the material comprising the pipe and cold works the pipe material to form circumferential groove 34.

It is desirable to include a plurality of tools such as the grooving roll 24 on support 26 so that multiple operations may be performed on a pipe efficiently with a single device. Examples of practical auxiliary tools useable with the grooving roll are provided below.

Figure 5:
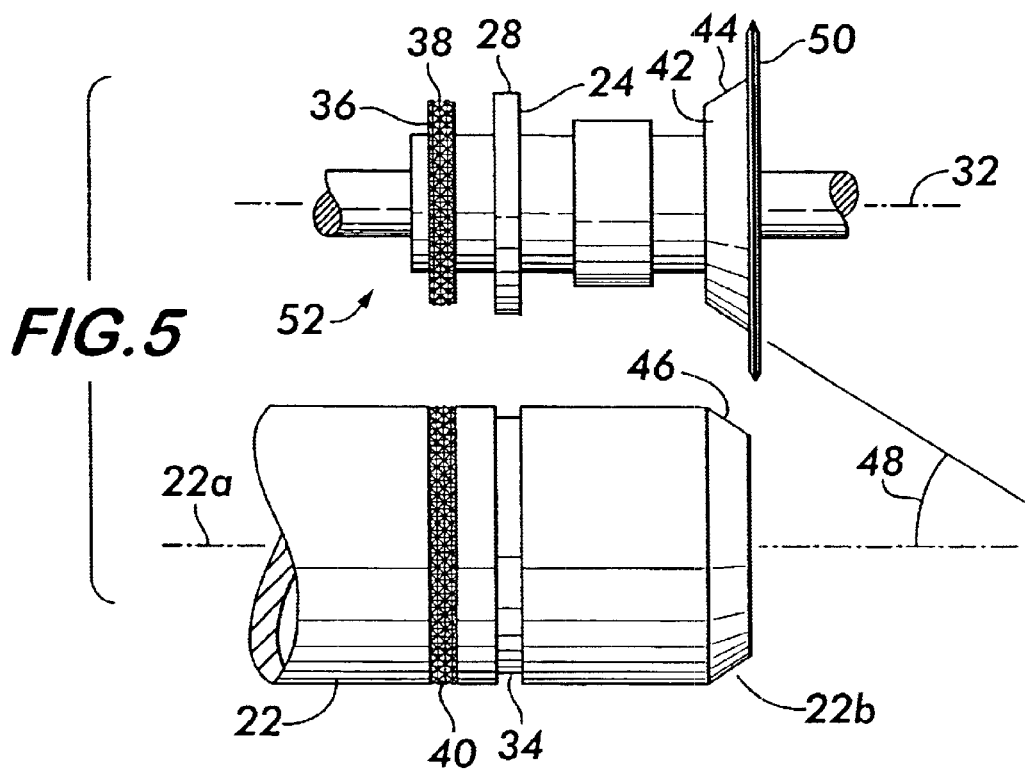
FIGS. 5, 5A and 6 are detailed views of multi-function tool sets usable with the device according to the invention.

FIG. 2 also shows a marking roll 36 rotatably mounted on support 26 coaxially with grooving roll 24. Marking roll 36 has a smaller diameter than grooving roll 24 and preferably has a knurled circumferential surface 38. The diameter of the marking roll is sized so that the knurled surface 38 engages the pipe 22 when the grooving roll is near the end of its motion toward the support 12 forming the groove 34 to a desired depth. As shown in FIG. 5, upon engagement with pipe 22, the knurled surface 38 imprints a pattern 40 on the pipe which may be used, for example, to indicate the required penetration depth of the pipe into a fitting so that the circumferential groove 34 properly engages a retaining feature in the fitting. The lateral spacing of the marking roll 36 from the grooving roll 24 is arranged so that the pattern 40 is properly spaced from circumferential groove 34 to correctly indicate required pipe penetration depth.

The marking roll 36 may alternatively be a gravure roller which transfers a printed pattern onto the pipe, an imprinting roll or another grooving roll. Furthermore, the surface 38 for marking the pipe need not be on the circumference of a roll or wheel but could be along a knife edge or at the tip of a stylus appropriately mounted on the support 26.

FIG. 2 further shows a chamfering roll 42 rotatably mounted on support 26 coaxially with grooving roll 24. As shown in FIG. 5, chamfering roll 42 has a chamfering surface 44 engageable with the end 22b of pipe 22 to form a chamfer 46. Chamfering surface 42 is oriented at an angle 48 relatively to the longitudinal axis 22a of pipe 22 and faces the end 22b of pipe 22. When device 10 and pipe 22 are rotated relatively to one another and the support 26 is advanced toward the support 12, chamfering surface 44 engages the pipe end 22b to form the chamfer 46 circumferentially around the pipe. Chamfering the pipe 22 removes any burrs or sharp edges from the end which may have formed when the pipe was cut and also provides a surface at the end of the pipe which will facilitate its entry into a fitting.

FIG. 2 also shows a cutting blade 50 rotatably mounted on support 26 coaxially with grooving roll 24. Cutting blade 50 is preferably mounted on or adjacent to the chamfering roll 42 and has the largest diameter of any of the other tools on the support so that as the support 26 is moved toward the support 12 the cutting blade 50 first engages and cuts pipe 22 supported on rollers 14 and 16. As the cut proceeds, the support 26 is moved further toward the pipe 22, thus, successively engaging chamfering roll 42 and grooving roll 24 with the pipe 22 to form chamfer 46 on the end 22b and the circumferential groove 34 respectively. Near the end of travel of support 26 the marking roll 36, preferably being the smallest diameter tool, is engaged with the pipe 22 allowing its knurled surface 38 to form the pattern 40. In an alternate embodiment, it is conceivable that the cutting blade may be smaller than the grooving roll or even the marking roll, depending upon the order in which the functions are to occur.

Taken together, grooving roll 24, marking roll 36, chamfering roll 42 and cutting blade 50, as shown in FIG. 5, may be considered a multiple function tool set 52 which is removably mounted on support 26 and readily interchanged with other tool sets which may comprise fewer or more tools, as well as tools of different sizes to form grooves or chamfers of different widths and depths adaptable for use on different diameter pipes.

Figure 5A:
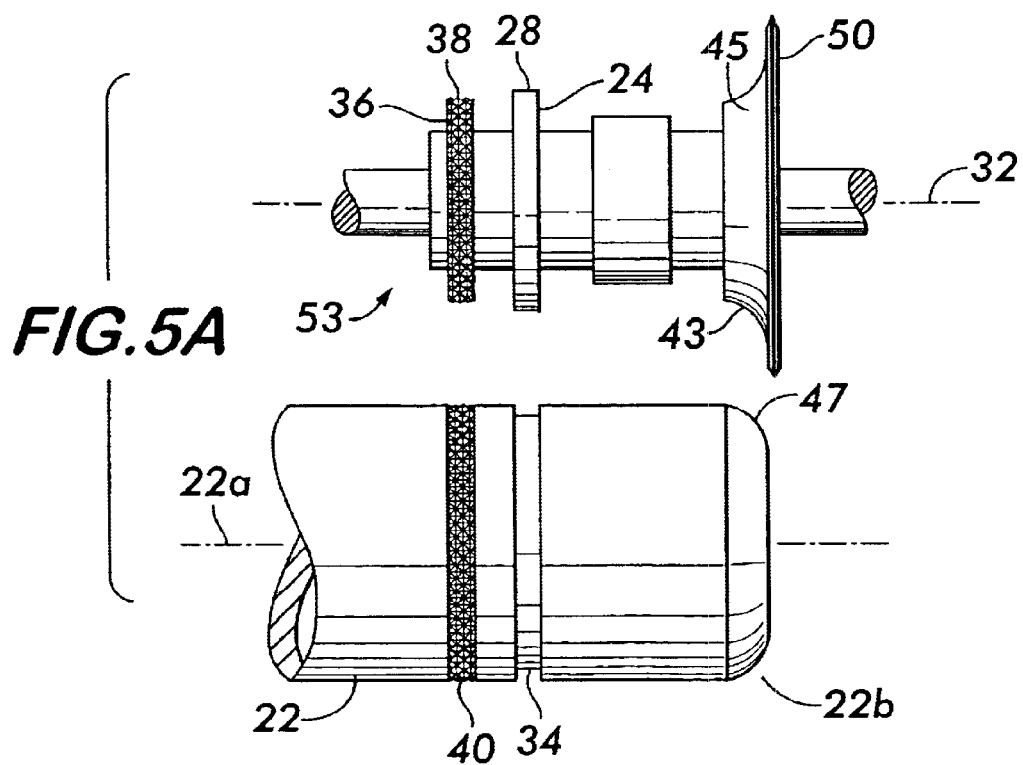

FIG. 5a shows a multiple function tool set 53 having a radiusing roll 43 in place of the chamfering roll. The radiusing and chamfering rolls are similar in that both rolls provide a surface for engaging and deforming the end 22b of the pipe 22. Radiusing roll 43 is rotatably mounted on support 26 coaxially with grooving roll 24 and has a curved radiusing surface 45 positioned circumferentially around the roll. Radiusing surface 45 faces the grooving roll and the end 22b of pipe 22. When device 10 and pipe 22 are rotated relatively to one another and the support 26 is advanced toward the support 12, radiusing surface 45 engages the pipe end 22b to form a curved radius 47 circumferentially around the pipe. Similar to chamfering, radiusing the pipe 22 removes any burrs or sharp edges from the end which may have formed when the pipe was cut and also provides a surface at the end of the pipe which will facilitate its entry into a fitting, reduce the engagement force required to seat the pipe and prevent damage to the O-ring or other elastomeric seal which may be in the fitting.

Figure 6:
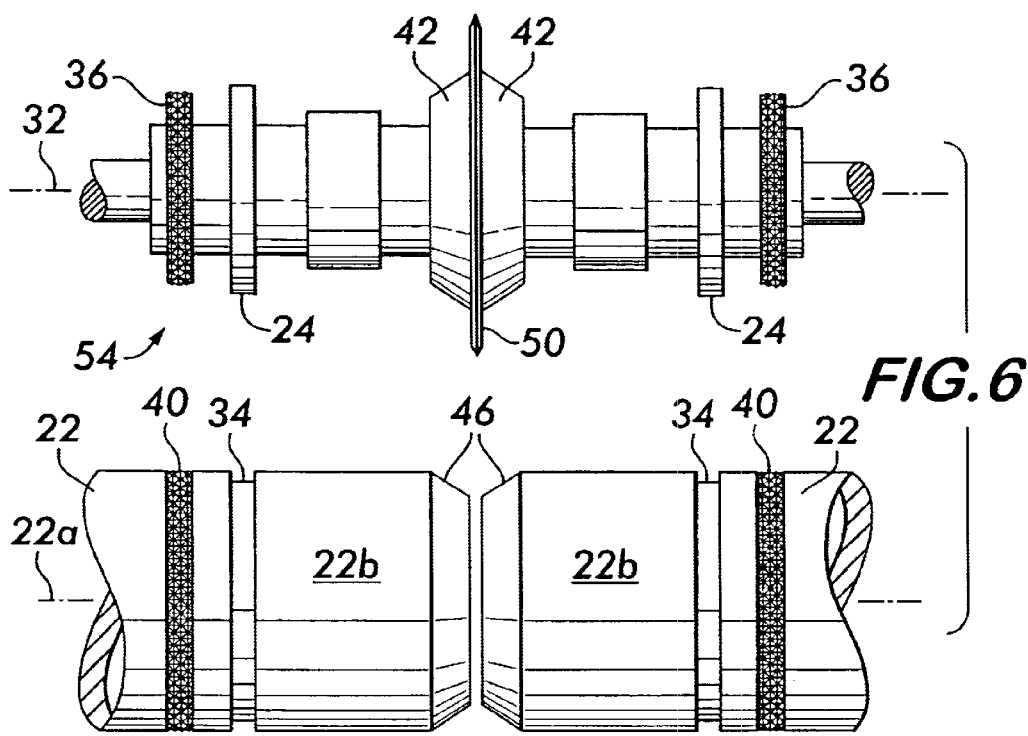

FIG. 6 shows another embodiment of a multiple function tool set 54 which may be rotatably mounted on support 26 for rotation about axis 32. Multiple function tool set 54 has one cutting blade 50 but two chamfering rolls 42, two grooving rolls 24 and two marking rolls 36. The tool set is preferably symmetrically arranged about the cutting blade 50, but it is also contemplated that asymmetrical configurations will be useful. When such a multiple function tool set 54 is used, both portions of the pipe 22 resulting from the cut will be processed and each will have an end 22b with a chamfer 46, a circumferential groove 34 properly spaced from the pipe end 22b and a pattern 40 properly spaced from the associated circumferential groove 34 as shown in FIG. 6. Such a tool will greatly increase the efficiency of processing pipe.

Figure 4:
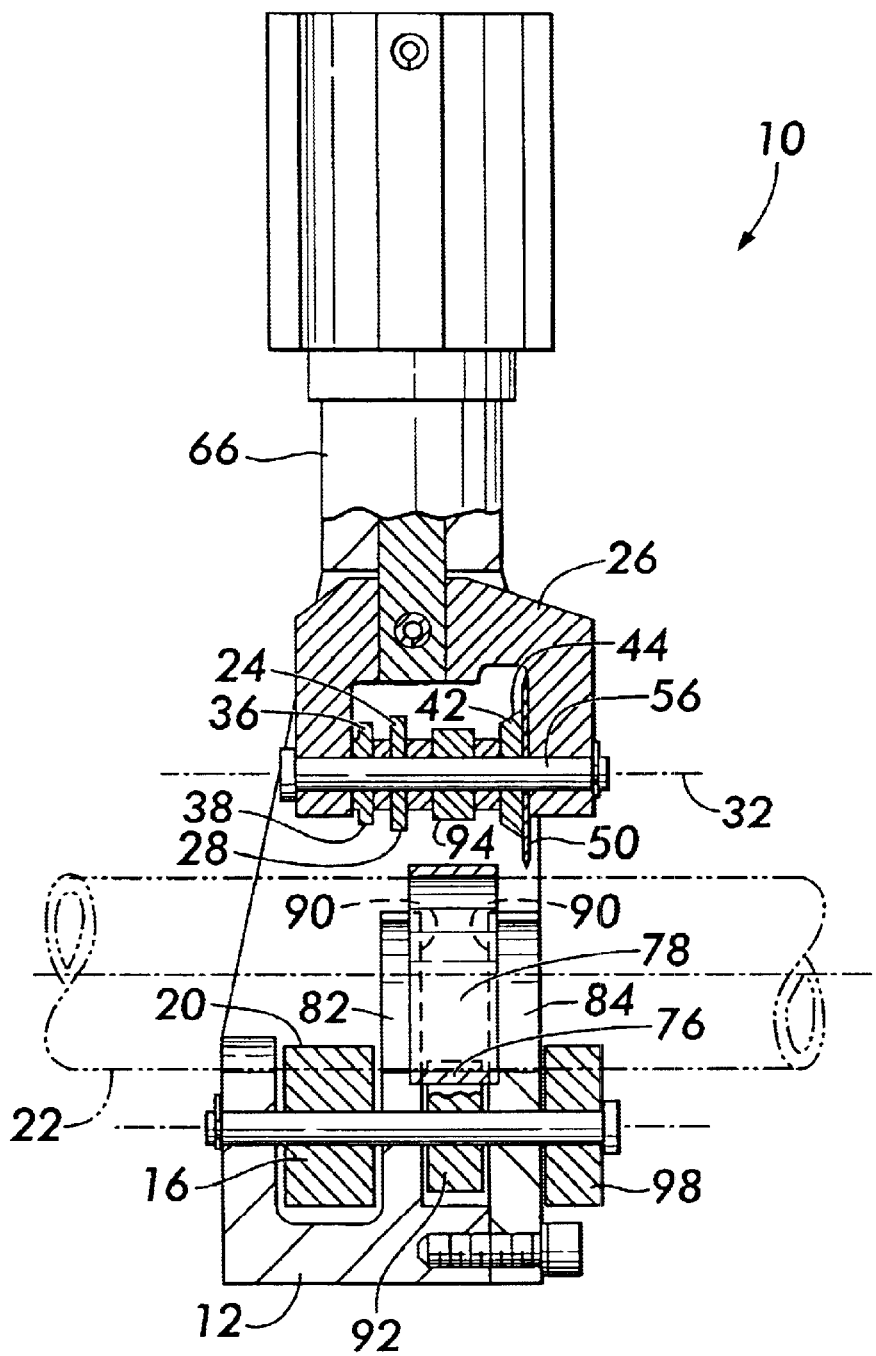
FIG. 4 is a sectional view taken along lines 4—4 of FIG. 3.

The various rolls such as the marking roll 36, the grooving roll 24, the chamfering roll 42 as well as the cutting blade 50 may be integrally formed on a single shaft and, thus, rotate together as they traverse the pipe circumference. However, when the different diameter rolls are forced to rotate through the same angular displacement there may be slippage of the surfaces, such as the grooving surface 28 or the knurled surface 38 relatively to the pipe 22. As this slippage may be a source of resistance to the relative rotation between the pipe 22 and the device 10, it is preferable to allow the rolls and blade to rotate independently of one another on a common shaft. Such a multiple function tool set is shown in FIG. 4, wherein each element of the tool set is mounted on an axle 56 for independent rotation relative to one another about axis 32.

Figure 7:
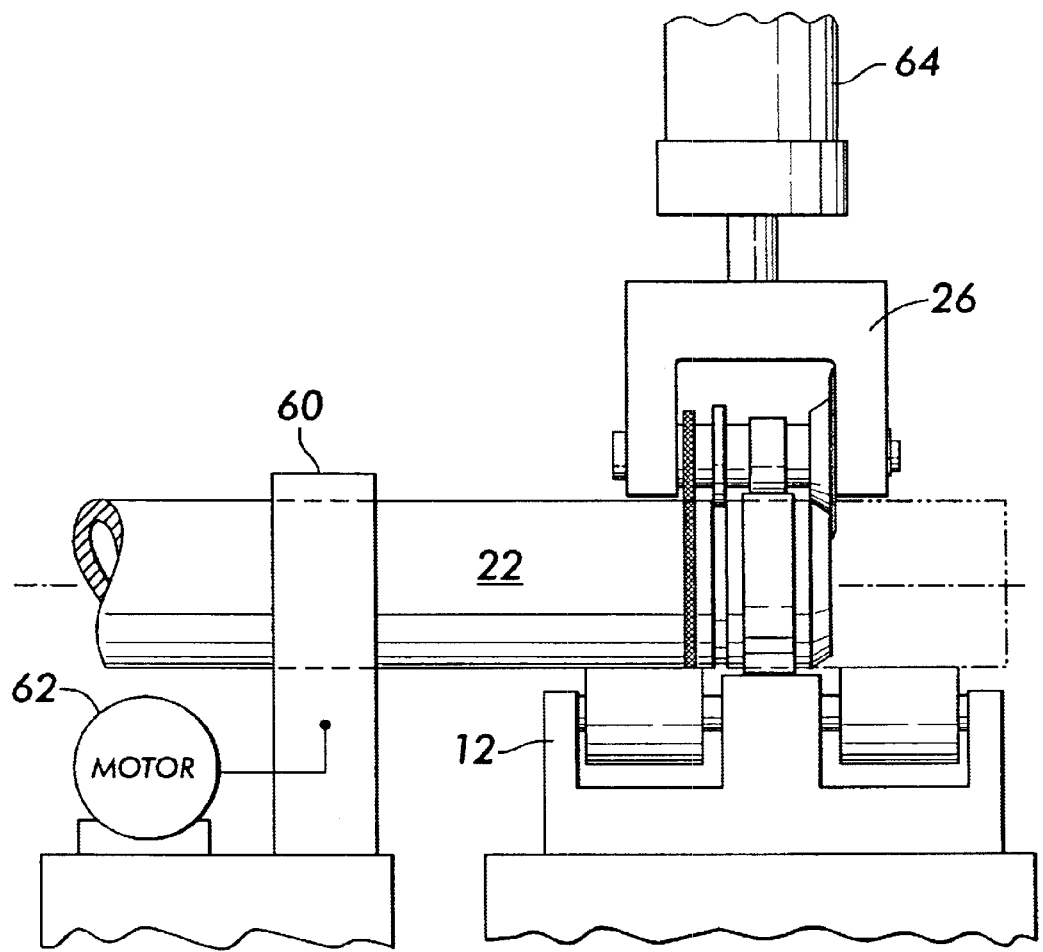
FIG. 7 is a side view of an automated embodiment of the device according to the invention.

The multi-function pipe preparation device 10 comprising a support 12 and a movable support 26 with the various tools rotatably mounted thereon may readily be adapted to either automated or manual use. In an example of an automated device depicted schematically in FIG. 7, pipe 22 is held in a chuck 60 rotatable by an electric motor 62 or other motive means, and the supports 12 and 26 are arranged adjacent to the chuck. Motion of the support 26 toward the support 12 may be effected by a hydraulic ram 64 or other power actuator means. Such a system is preferred for relatively larger diameter pipes or pipes comprised of a relatively hard material as well as for mass production for increased productivity.

For smaller diameter pipes, such as the half inch ASTM standard copper tubing, the manual device 10 illustrated in FIGS. 1 through 4 is practical. As best shown in FIG. 1, device 10 has an elongated handle 66 which extends from the support 12 substantially perpendicular to the long axis 22a of pipe 22. Handle 66 provides increased leverage facilitating rotation of device 10 relatively to pipe 22. The handle also provides a convenient mount for the support 26.

In the manual device 10, the support 26 is movable toward and away from the support preferably by means of a manually operated jack screw assembly 68 mounted within handle 66. The support 26 is mounted at one end 70 of the jack screw assembly 68 proximate to the first support 12 while a knob 72 is mounted at the opposite end of the jack screw assembly. Turning the knob 72 as shown by curved arrows 74 in FIG. 2 advances or retracts the support 26 toward and away from support 12 in the direction of arrows 30 as is well understood for devices such as manual pipe cutters.

To ensure that the pipe remains round when subjected to pressure from the grooving roll 24 and other tools, support 12 includes a collar 76 (see FIG. 1) mounted adjacent to support rollers 14 and 16 and coaxially with the longitudinal axis 22a of the pipe 22. When, as shown in FIG. 2, the pipe 22 is supported on rollers 14 and 16 it is inserted through collar 76. The collar has a circumferential side wall 78 defining an opening 80 which is sized to receive the pipe with minimum clearance so that the pipe wall engages the circumferential side wall 78 of the collar 76. As best shown in FIG. 2, the grooving roll 24 is preferably positioned to engage pipe 22 immediately adjacent to the collar 76. This allows the collar to provide maximum radial reinforcement to the pipe wall and prevent it from going out of round or collapsing as the grooving roll is forcibly engaged with the pipe to form circumferential groove 34. This reinforcing function of the collar 76 is especially beneficial for thin-walled pipe, and the collar may be dispensed with in the processing of relatively thick-walled pipe. Note that the collar does not extend over the entire portion of pipe 22 beneath support 26 so that the chamfering roll 42 and cutting blade 50 may engage and properly cut and chamfer the pipe end.

Preferably, collar 76 is rotatably mounted within the support 12 as shown in FIG. 2, where the collar 76 is trapped between a pair of side walls 82 and 84. As shown in FIG. 1 side walls 82 and 84 have openings 86 and 88 in registration with the opening 80 of collar 76. Side wall openings 86 and 88 are oriented and sized to receive pipe 22 when the pipe engages rollers 14 and 16 on support 12. Preferably, at least one of the side walls has a retaining surface 90 (see FIG. 2) which extends outwardly toward the other side wall to capture the collar 76 and retain it rotatably between the side walls. The collar 76 may also be further supported on a pair of roller bearings 92 best shown in FIG. 3) which are mounted on support 12 preferably coaxially with rollers 14 and 16. Allowing the collar to rotate will reduce friction and minimize the torque required to turn the device 10 relatively to the pipe 22. The collar may also be non-rotating, in which case it is desirable to provide a friction reducing surface between the collar and the pipe, such as a layer of PTFE or liquid or powdered lubricant.

As best shown in FIG. 2, the collar 76 also cooperates with a cylindrical barrel section 94 located between the grooving roll 24 and the chamfering roll 42 to form a depth stop, ensuring that the circumferential groove 34 is formed to the proper depth. The diameter of barrel section 94 is sized so that when it contacts the collar 76 the groove 34 is at the desired depth and the support 26 can be advanced no further. When the collar 76 and barrel section 94 are used as a depth stop, they ensure a uniform depth of groove relative to the outer surface of the pipe due to the fact that the outer and inner diameters of the collar are concentric with the outer diameter of the pipe. Uniform groove depth relative to the outer surface of the pipe is desired because it allows maximum strength to be developed in mechanical pipe joints in which the groove engages a toothed ring or other type of mechanical retaining means.

When device 10 is used as a two function tool to groove and mark a pipe, retaining wall 84 preferably does not have opening 88. Wall 84 will, thus, block motion of the pipe 22 along axis 22a. The device 10 is dimensioned so that when pipe 22 is in contact with side wall 84 the circumferential groove 34 and the pattern 40 are properly positioned relatively to the pipe end as required to accommodate a particular pipe fitting, such as a mechanical coupling using a toothed retainer to engage the groove and fix the pipe to the coupling.

In manual operation of device 10 shown in FIG. 2, the pipe 22 is supported on rollers 14 and 16 and inserted through collar 76. Additional rollers 96 and 98 may also be used to provide support to the pipe on the opposite side of the collar 76. Knob 72 of jack screw assembly 68 is rotated to advance support 26 toward support 12 and bring cutting blade 50, chamfering roll 42, grooving roll 24 and marking roll 36 successively into forced contact with the pipe. As the support 26 is advanced the device is manually rotated around the longitudinal axis 22a of the pipe 22. Handle 66 provides leverage facilitating manual turning of the device. The cutting blade 50 cuts the pipe and the chamfering roll deforms the cut end by cold working to form the chamfer 46 and also eliminate any burrs or raised edges formed at the pipe end during cutting. Grooving roll 24 cold works the pipe to form the circumferential groove 34 and the marking roll imprints the pipe surface with pattern 40.

As it is impractical to cut and chamfer the pipe or form the groove 34 to its desired depth in one revolution of the device around axis 22a, the support 26 is advanced in a series of steps alternating with revolutions of the device around the pipe to incrementally form the cut, the chamfer and the groove. At some point in this process, marking roll 36 contacts pipe 22 and its knurled circumferential surface 38 begins marking the pipe. Once barrel portion 94 is in contact with collar 76 and the device has thereafter been rotated completely around the pipe, the pipe has been cut, groove 34 is at the proper depth, the chamfer 46 is complete, and the pattern 40 is marked on the pipe outer surface. The knob 72 is then rotated in the opposite direction to retract the support 26 away from support 12, disengaging the marking roll 36, the grooving roll 24, and the chamfering roll 42 from the pipe. The pipe may then be removed from the device 10.

Another embodiment of the device according to the invention is shown at 100 in FIGS. 8 through 13. Device 100 also has a first support 12 on which are mounted rollers 14 and 16 having surfaces 18 and 20 which engage and support the circumferential surface of pipe 22 (see FIGS. 9 and 12).

Figure 9:
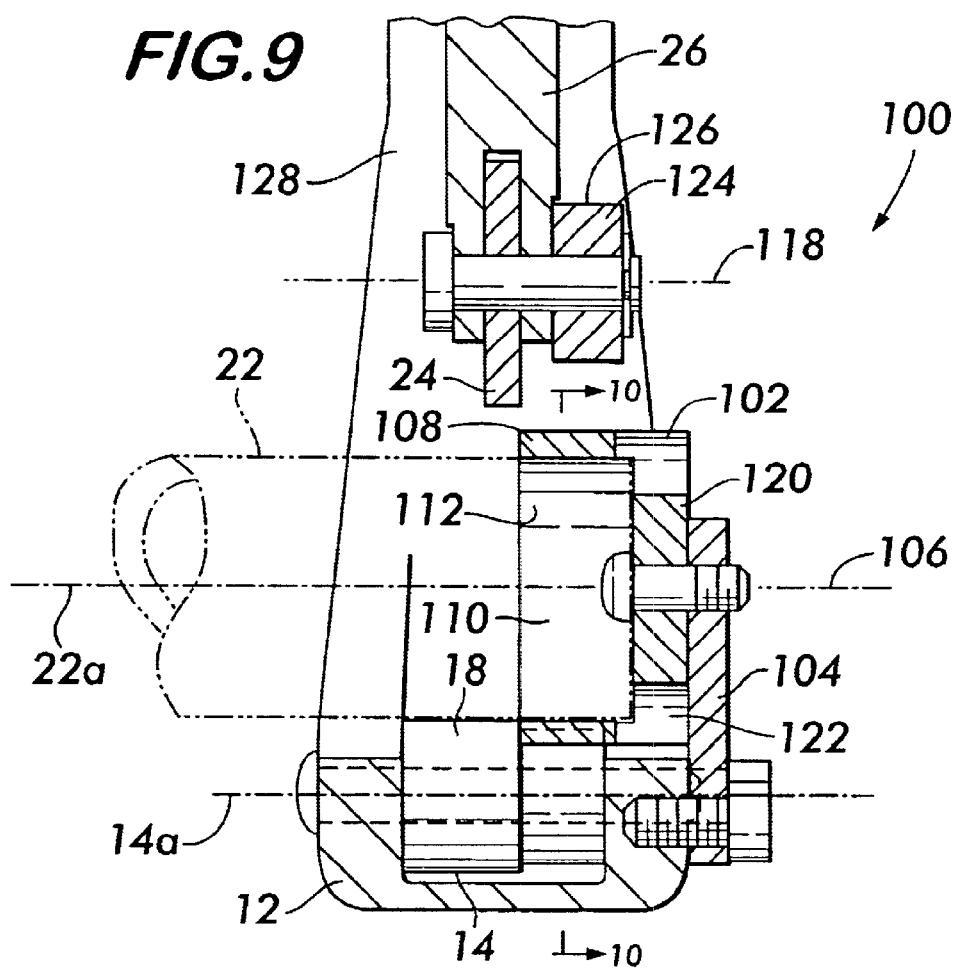
FIG. 9 is a partial sectional view taken along lines 9—9 of FIG. 8.
Figure 12:
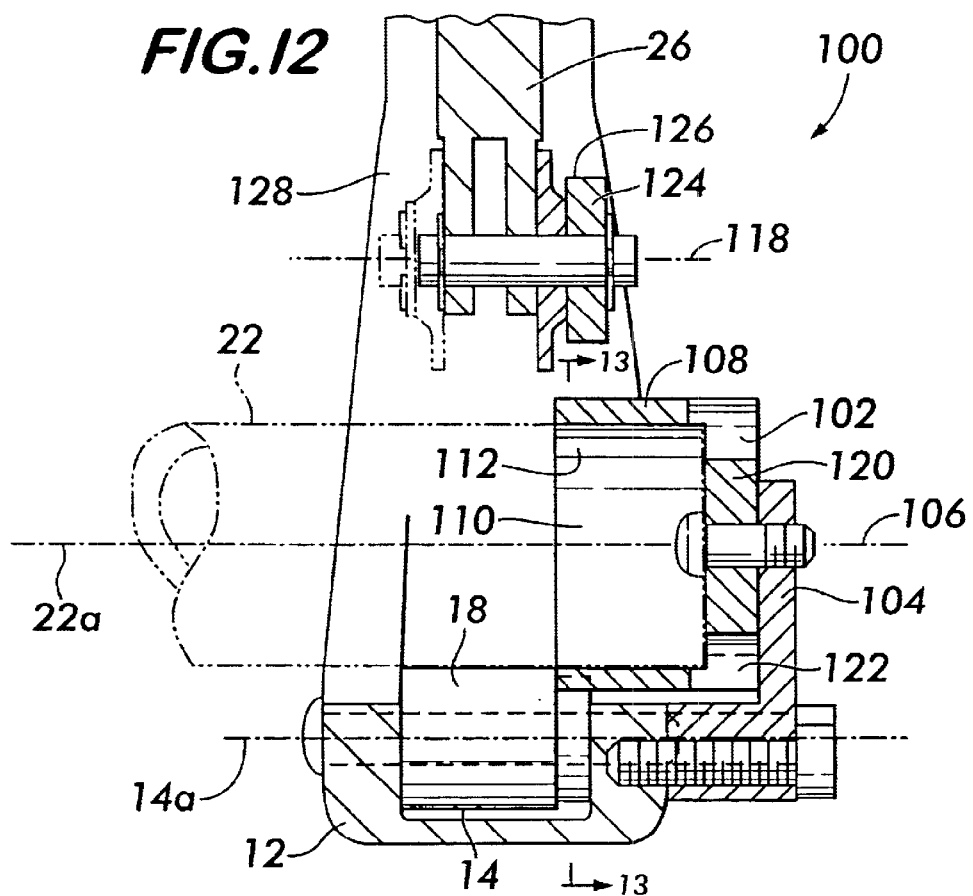
FIG. 12 is a partial sectional view taken along lines 12—12 of FIG. 11.

In this embodiment, a cup 102 is also mounted on first support 12 by an attachment plate 104 bolted to the support. Cup 102 is preferably rotatable about an axis 106 which is preferably oriented substantially parallel to and coaxially with the longitudinal axis 22a of pipe 22 when the pipe is supported on rollers 14 and 16. Cup 102 has a circumferential side wall 108 defining an opening 110, also concentric with the axis 106. As best shown in FIGS. 9 and 12, opening 110 is positioned to receive pipe 22 when it is supported on rollers 14 and 16. The inside surface 112 of cup 20, also defined by cup side wall 108, is substantially continuously circumferentially engageable with the outside surface of pipe 22 to provide radial reinforcement similarly to collar 76.

Figure 8:
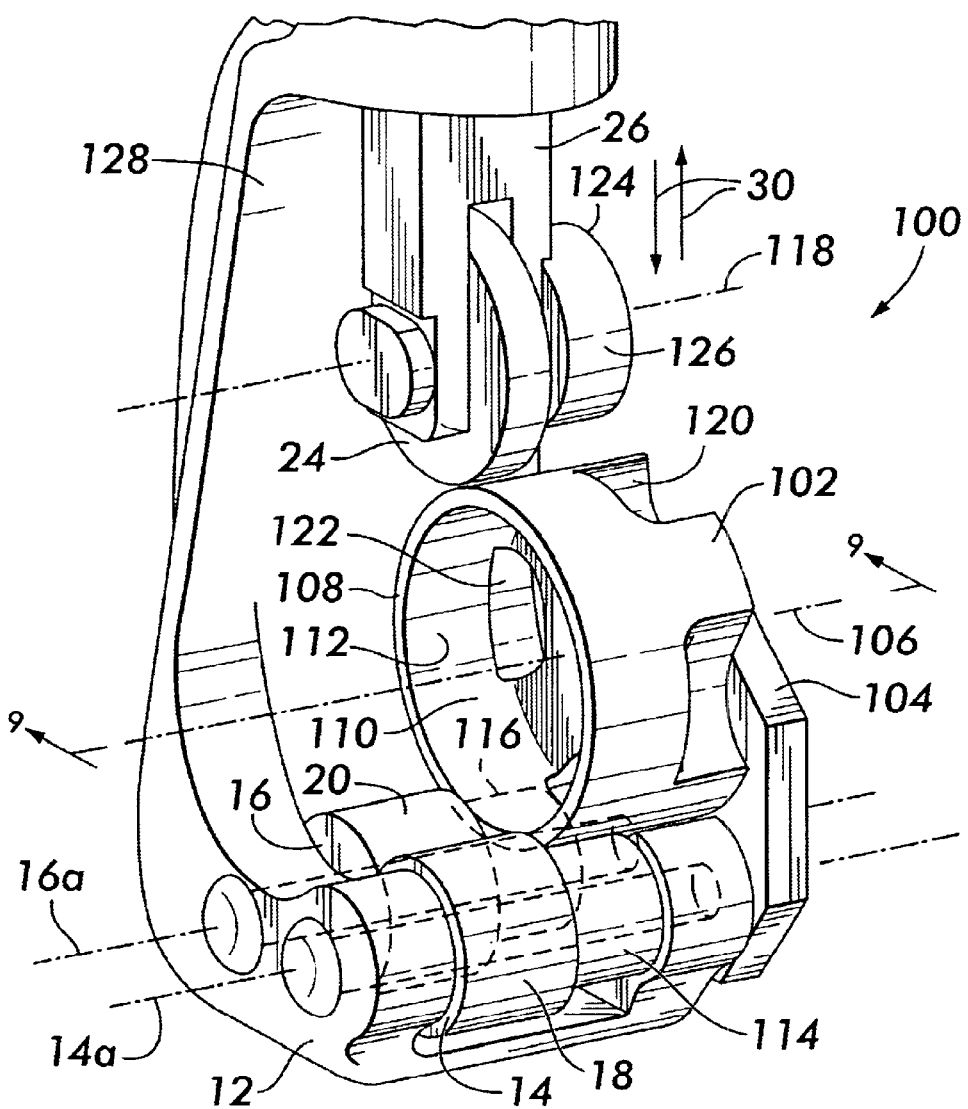
FIG. 8 is a partial perspective view of another embodiment of the device according to the invention.
Figure 10:
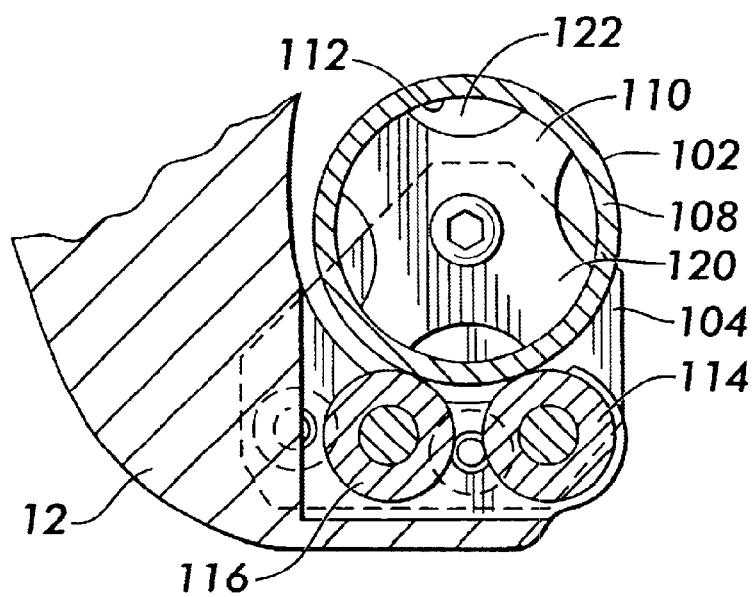
FIG. 10 is a partial sectional view taken along lines 10—10 of FIG. 9.
Figure 11:
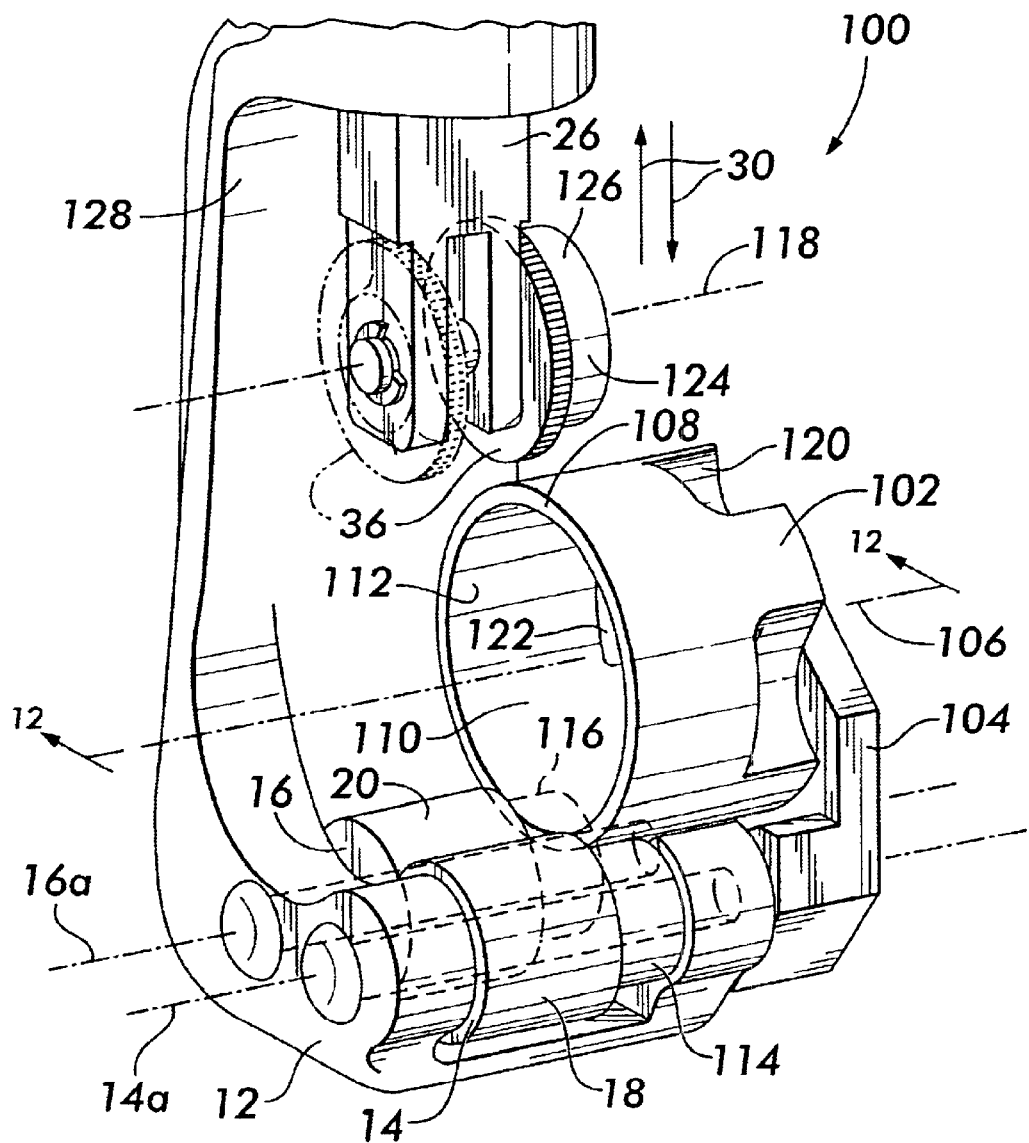
FIG. 11 is a partial perspective view of another embodiment of the device according to the invention.
Figure 13:
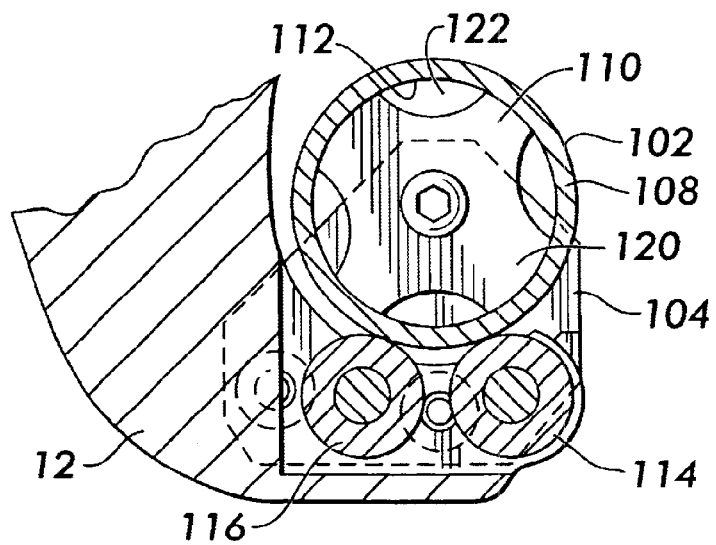
FIG. 13 is a partial sectional view taken along lines 13—13 of FIG. 12.

As best shown in FIGS. 10 and 13, cup 102 is preferably supported by one or more rollers 114 and 116 which are mounted on first support 12 coaxially with support rollers 14 and 16. As shown in FIGS. 8 and 11, rollers 114 and 116 are rotatable about respective axes 14a and 16a. The rollers 114 and 116 are most effective when they are positioned adjacent to the opening 110 to prevent the cup from bending out of alignment with axis 22a when forces are applied to form a groove in a pipe or mark the pipe as described below.

As further shown in FIGS. 8 through 13, device 100 also has a second support 26 which is movable relatively to the first support 12. In the preferred embodiment, the second support is movable in the direction indicted by arrows 30, which is substantially perpendicular to the pipe longitudinal axis 22a. Tools, such as the grooving roll 24 shown in FIGS. 8 and 9 and the marking rolls 36 shown in FIGS. 11 and 12, are mounted on support 26 facing support 12 for engagement with the outside surface of pipe 22. As described previously, the tools are preferably rotatably mounted for rotation about an axis 118 substantially parallel to the longitudinal axis 22a of the pipe 22.

Preferably, rollers 14 and 16 have equal diameters and the axis of rotation of tools such as grooving roll 24 and the marking rolls 36 is positioned equidistant from axes 14a and 16a to position the grooving roll directly opposite to rollers 14 and 16 so as to support pipe 22 at three points for maximum stability.

Grooving roll 24 must be pressed against pipe 22 with sufficient force to cause the pipe material to yield and take the permanent set forming groove 34. The required forces are such that it is preferred to make wheel 24 from hardened steel so that it does not suffer any stress induced distortion when pressed against the pipe with the necessary force to create the groove. Since the required force is applied as a concentrated load at the wheel-pipe interface, the load will tend to distort the pipe into an oval shape and may even crush the pipe. It is advantageous to use the inside surface 112 of cup 102 to provide radial reinforcement to the pipe about its circumference to prevent the pipe from deforming out of round (and possibly collapsing) as a result of the applied force. As with the collar 76, use of the cup 102 will allow relatively high forces to be applied without deforming the pipe. It is also advantageous to locate grooving roll 24 directly adjacent to opening 110 of cup 102, as shown in FIG. 9, to ensure that the pipe is adequately supported by the cup. The cup will provide less support the further away it is from the point of contact between the grooving roll 24 and the pipe 22.

In addition to reinforcing the pipe wall during groove forming, cup 102 may be used to locate the groove 34 or pattern 40 axially along the pipe 22, thereby setting a desired distance between the pipe end and the groove or marking pattern. The proper distance between the pipe end and the groove or pattern will only be obtained when the pipe is fully inserted into the cup and the cup has the proper depth. To perform this locating function therefore, cup 102 is provided with a bottom 120 best shown in FIGS. 9 and 12. Bottom 120 is arranged substantially perpendicularly to the axis of rotation 106 of cup 102 and faces opening 110 to engage the end of pipe 22 upon insertion of the pipe into the cup. Apertures 122 are positioned in cup side wall 108 adjacent to bottom 120 for visually observing that pipe 22 is properly engaged with the cup bottom so that the groove will have the desired spacing from the pipe end. Note that the depth of the cup 102 may be different depending upon whether the device 100 is used to mark the pipe or groove the pipe, since grooves and marking patterns are most commonly located at different distances from the pipe end. Comparison of FIGS. 9 and 12 show the required variation in cup depth to locate the groove at a first distance from the end of the pipe, and the marking pattern (or patterns for the multiple wheels 36 shown) at another distance from the pipe end.

As noted above, cup 102 is also supported by the second pair of rollers 114 and 116. These rollers serve as reaction points against the force transmitted to the cup by the pipe when the grooving roll 24 presses against it during groove forming and help keep the cup concentric with its axis of rotation 106. Cup 102 also keeps the pipe parallel to the axis of rotation 118 of the grooving roll 24, thus, preventing the pipe from deflecting out of square with it.

As noted above, applying the grooving roll to the outside of the pipe according to the invention allows the tool to produce a groove of a uniform depth regardless of wall thickness variations in the pipe. Prior art grooving devices have a wheel which engages the inside surface of the pipe and consequently produces a groove which is concentric with the tube inside surface. This results in a non-uniform groove depth when the pipe wall has non-uniform thickness around its circumference. The uniformity of the groove depth is important when mechanical couplings are used to effect pipe joints since the coupling strength is degraded when the groove depth is not uniform relative to the pipe's outer surface.

Groove depth is controlled in the device 100 by means of a depth positioning roller 124 best seen in FIGS. 8 and 9. Depth positioning roller 124 is mounted on the movable support 26 for rotation about axis 118. Roller 124 is positioned in spaced relation to grooving roll 24 and in overlying relation with cup 102. The diameter of roller 124 is established in relation to the diameter of grooving roll 24 so that the circumferential surface 126 of roller 124 contacts cup 102, halting the motion of wheel 24 toward the pipe 22 when the desired groove depth is achieved.

To enable device 100 to be manually operated, a handle 128, as described for the previous embodiment, is attached to support 12 to provide leverage for turning the device relatively to the pipe. The movable support 26 is again conveniently located on the handle 128 and is actuated by means of a jack screw assembly and knob (not shown).

It is contemplated that the cup 102 will be easily interchangeable to readily adapt the device for use with different size pipes and tubes. Roll groovers 24 and marking wheels 36 are also interchangeable to allow wheels with different diameters, thicknesses and circumferential surface patterns to be used to create grooves of different depth, width and texture.

Figure 14:
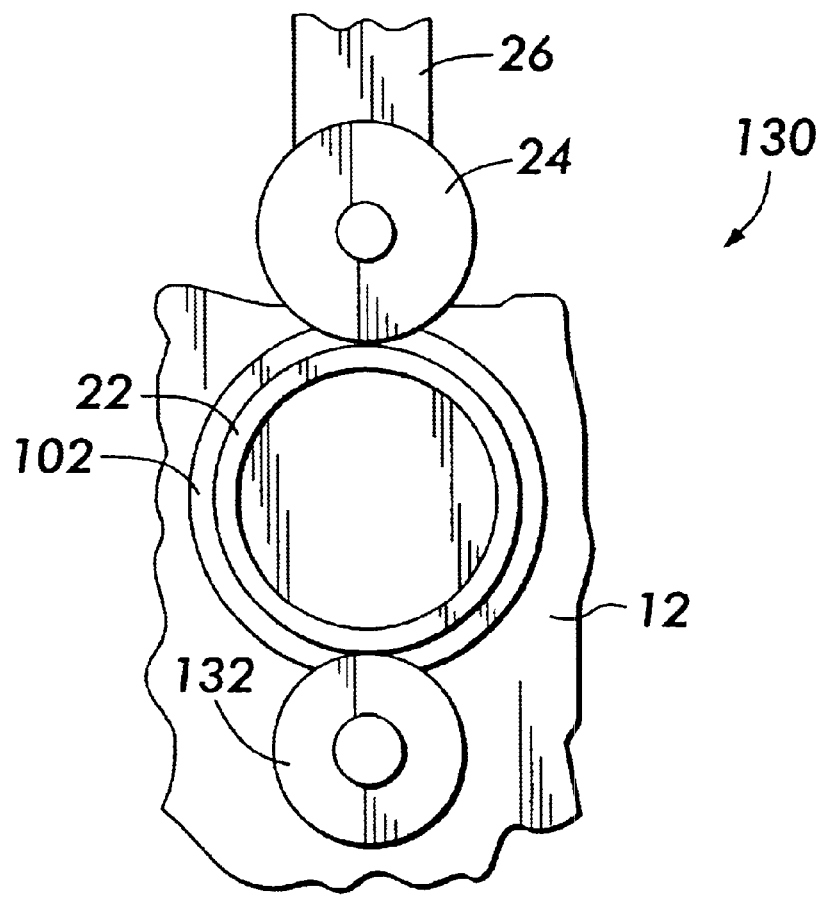
FIG. 14 is a partial side view of yet another embodiment of the device according to the invention.

FIG. 14 shows another embodiment 130 of the device using one support roller 132 arranged on support 12 diametrically opposite to grooving roll 24 relative to pipe 22. Cup 102 is used to hold the pipe between the grooving roll 34 and the support roller 132 when force is applied to form the groove.

Note that if proper care is taken not to apply too much force between grooving roll 24 and pipe 22 at once, it is possible to eliminate cup 102 from all embodiments of the device except device 130. As long as the force applied by the grooving roll to the pipe is enough to impress the groove, but insufficient to force the pipe out of round, the cup will not be needed to support the pipe end.

Alternately, if the cup is to be used it need not be attached to the device, but could be placed on the end of the pipe before the grooving roll 24 engages it. Similarly, a plug fitting within the pipe bore may also be used to support the pipe and prevent it from going out of round.

It should be further understood that, although it is preferred to hold the support 12 fixed and move the support 26 so as to effect engagement of the various tools with the pipe, it is also feasible to hold the support 26 fixed and force the pipe into engagement with tools mounted on it by moving the support 12.

Use of the pipe preparation device according to the invention will allow grooves of uniform depth to be formed at predetermined locations in piping or tubing regardless of the uniformity of the tube wall thickness without the use of a wheel positioned internally of the tube or pipe. The tube will remain substantially round despite the relatively large concentrated loads imposed on the outer surface due to the support provided by the collar or cup. The device is adaptable for both manual and automated use, the manual embodiment having a handle to provide leverage for rotating the tools about the tube by hand.

The multi-function embodiment according to the invention allows pipes to be cut, chamfered, radiused, grooved and marked easily and quickly with one device. The device may be manually operated for relatively small diameter pipes or a power device for the larger sizes and mass production. The device according to the invention may also be adapted to handle pipes of different sizes by providing interchangeable parts dimensioned appropriately to the particular pipe.

What is claimed is:

1. A device for performing at least one of a plurality of operations on a pipe, said pipe having a longitudinal axis and an outer circumferential surface, said device comprising:

a first support having a support surface engageable with the outer circumferential surface of said pipe;

a cup mounted on said first support, said cup having a circumferential side wall defining an opening oriented and sized to receive an end of said pipe when said pipe engages said first support, said circumferential side wall being engageable with said outer circumferential surface of said pipe and providing radial reinforcement thereto, said cup being rotatable about an axis of rotation substantially parallel to said longitudinal axis of said pipe;

a second support positioned in spaced relation to said first support, one of said supports being movable toward and away from the other; and at least one tool mounted on said second support and positioned facing said first support, each tool and said pipe being rotatable relatively to one another around said longitudinal axis to effect said operation, each tool being engageable with said outer circumferential surface of said pipe when said pipe is supported on said first support, each tool being independently selected from the group consisting of a grooving surface, a marking surface, a radiusing surface and a chamfering surface, said plurality of operations including forming a circumferential groove around said pipe with said grooving surface, forming a reference mark circumferentially around said pipe with said marking surface, radiusing the outer surface of said pipe with said radiusing surface and chamfering the outer surface of said pipe with said chamfering surface.

2. A device according to claim 1, wherein said tool comprises a grooving roll rotatably mounted on said second support and having a circumferential surface comprising said grooving surface, said grooving roll having an axis of rotation substantially parallel to said longitudinal axis of said pipe.

3. A device according to claim 1, wherein said tool comprises a marking roll rotatably mounted on said second support and having a circumferential surface comprising said marking surface, said marking roll having an axis of rotation substantially parallel to said longitudinal axis of said pipe.

4. A device according to claim 3, wherein said circumferential surface is knurled.

5. A device according to claim 1, wherein said tool comprises a chamfering roll rotatably mounted on said second support and rotatable about an axis of rotation substantially parallel to said longitudinal axis of said pipe, said chamfering roll having a circumferential surface angularly oriented relatively to said axis of rotation, said circumferential surface comprising said chamfering surface.

6. A device according to claim 1, wherein said tool comprises a radiusing roll rotatably mounted on said second support and rotatable about an axis of rotation substantially parallel to said longitudinal axis of said pipe, said radiusing roll having a curved circumferential surface engagable with an end of said pipe, said circumferential surface comprising said radiusing surface.

7. A device according to claim 1, further comprising a plurality of rollers mounted adjacent to one another on said first support, each of said rollers having a respective circumferential surface comprising a portion of said support surface, said rollers being rotatable about respective axes which are substantially parallel to the longitudinal axis of said pipe.

8. A device according to claim 1, wherein said cup has a bottom positioned opposite to said opening, an aperture being positioned in said circumferential side wall adjacent to said bottom allowing visual confirmation that said pipe end is received by said cup and is in contact with said bottom.

9. A device according to claim 1, further comprising a roller rotatably mounted on said first support and positioned substantially diametrically opposite to said tool relatively to said cup, said roller having a circumferential surface comprising said support surface.

10. A device for performing a plurality of operations substantially concurrently on a pipe, said pipe having a longitudinal axis and an outer circumferential surface, said device comprising:

a first support having a support surface engageable with the outer circumferential surface of said pipe;

a cup mounted on said first support, said cup having a circumferential side wall defining an opening oriented and sized to receive an end of said pipe when said pipe engages said first support, said circumferential side wall being engageable with said outer circumferential surface of said pipe and providing radial reinforcement thereto, said cup being rotatable about an axis of rotation substantially parallel to said longitudinal axis of said pipe;

a second support positioned in spaced relation to said first support, one of said supports being movable toward and away from the other;

a first tool comprising a grooving surface mounted on said second support and positioned facing said first support, said grooving surface being engageable with said outer circumferential surface of said pipe when said pipe is supported on said first support;

a second tool mounted on said second support and positioned facing said first support, said second tool being engageable with said outer circumferential surface of said pipe substantially concurrently with said first tool, said second tool being selected from the group consisting of a marking surface, a radiusing surface, a chamfering surface and a cutting blade, said plurality of operations including forming a circumferential groove around said pipe with said grooving surface, forming a reference mark circumferentially around said pipe with said marking surface, chamfering the outer surface of said pipe with said chamfering surface, radiusing the outer surface of said pipe with said radiusing surface and cutting said pipe with said cutting blade; and said first and said second tools and said pipe being rotatable relatively to one another around said longitudinal axis to effect said plurality of operations.

11. A device according to claim 10, wherein said first tool comprises a grooving roll rotatably mounted on said second support and having a circumferential surface comprising said grooving surface, said grooving roll having an axis of rotation substantially parallel to said longitudinal axis of said pipe.

12. A device according to claim 11, wherein said second tool comprises a marking roll rotatably mounted on said second support in spaced relation to and coaxially with said first tool, said marking roll being rotatable about said axis of rotation and having a circumferential surface comprising said marking surface.

13. A device according to claim 12, wherein said circumferential surface is knurled.

14. A device according to claim 11, wherein said second tool comprises a chamfering roll rotatably mounted on said second support in spaced relation to and coaxially with said first tool, said chamfering roll being rotatable about and having a circumferential surface angularly oriented relatively to said axis of rotation, said circumferential surface comprising said chamfering surface.

15. A device according to claim 11, wherein said second tool comprises a radiusing roll rotatably mounted on said second support in spaced relation to and coaxially with said first tool, said radiusing roll being rotatable about said axis of rotation and having a curved circumferential surface facing said first tool and engagable with an end of said pipe, said curved circumferential surface comprising said radiusing surface.

16. A device according to claim 10, further comprising a plurality of rollers mounted adjacent to one another on said first support, each of said rollers having a respective circumferential surface comprising a portion of said support surface, said rollers being rotatable about respective axes which are substantially parallel to the longitudinal axis of said pipe.

17. A device according to claim 10, wherein said cup has a bottom positioned opposite to said opening, an aperture being positioned in said circumferential side wall adjacent to said bottom allowing visual confirmation that said pipe end is received by said cup and is in contact with said bottom.

18. A device according to claim 10, further comprising a roller rotatably mounted on said first support and positioned substantially diametrically opposite to said first tool relatively to said cup, said roller having a circumferential surface comprising said support surface.

19. A device according to claim 10, further comprising an elongated handle attached to said first support and extending therefrom substantially perpendicularly to said long axis of said pipe, said handle facilitating manual rotation of said device relatively to said pipe.

20. A device according to claim 19, further comprising an elongated jackscrew mounted within said handle and having a long axis substantially perpendicular to said longitudinal axis of said pipe, one end of said jackscrew being positioned proximate to said first support and having said second support mounted thereon, a knob for manually moving said jackscrew toward and away from said first support being positioned at an opposite end of said jackscrew, manually turning said knob effecting motion of said second support toward and away from said first support.

21. A device for performing a plurality of operations substantially concurrently on a pipe, said pipe having a longitudinal axis and an outer circumferential surface, said device comprising:

a first support having a support surface engageable with the outer circumferential surface of said pipe;

a collar mounted on said first support, said collar having a circumferential side wall defining an opening oriented and sized to receive said pipe when said pipe engages said first support, said circumferential side wall being engageable with said outer circumferential surface of said pipe and providing radial reinforcement thereto; said collar being rotatable about an axis or rotation substantially parallel to said longitudinal axis of said pipe;

a second support positioned in spaced relation to said first support, one of said supports being movable toward and away from the other;

a plurality of tools mounted on said second support and positioned facing said first support, said tools being engageable substantially concurrently with said outer circumferential surface of said pipe when said pipe is supported on said first support, said tools including a grooving surface, a marking surface, a surface for deforming an end of said pipe and a cutting blade, said plurality of operations including forming a circumferential groove around said pipe with said grooving surface, forming a reference mark circumferentially around said pipe with said marking surface, deforming the outer surface of said pipe with said deforming surface and cutting said pipe with said cutting blade; and said tools and said pipe being rotatable relatively to one another around said longitudinal axis to effect said plurality of operations.

22. A device according to claim 21, wherein a first one of said tools comprises a grooving roll rotatably mounted on said second support and having a circumferential surface comprising said grooving surface, said grooving roll having an axis of rotation substantially parallel to said longitudinal axis of said pipe.

23. A device according to claim 22, wherein a second one of said tools comprises a marking roll rotatably mounted on said second support in spaced relation to and coaxially with said grooving roll, said marking roll having a circumferential surface comprising said marking surface and being rotatable about said axis of rotation.

24. A device according to claim 23, wherein said circumferential surface is knurled.

25. A device according to claim 23, wherein a third one of said tools comprises a chamfering roll rotatably mounted on said second support in spaced relation to and coaxially with said grooving roll and said marking roll, said chamfering roll being rotatable about said axis of rotation and having a circumferential surface angularly oriented relatively thereto, said circumferential surface comprising said surface for deforming said end of said pipe.

26. A device according to claim 25, wherein a fourth one of said tools comprises a circular cutting blade rotatably mounted on said second support adjacent to and coaxially with said chamfering roll, said circular cutting blade being rotatable about said axis of rotation.

27. A device according to claim 23, wherein a third one of said tools comprises a radiusing roll rotatably mounted on said second support in spaced relation to and coaxially with said grooving roll and said marking roll, said radiusing roll being rotatable about said axis of rotation and having a curved circumferential surface positioned facing said grooving roll and engagable with an end of said pipe, said curved circumferential surface comprising a radiusing surface for deforming said outer surface of said pipe.

28. A device according to claim 26, wherein said tools are mounted on an axle positioned on said second support coaxially with said axis of rotation, at least one of said tools being rotatable on said axle independently of another of said tools on said axle.

29. A device according to claim 21, further comprising a plurality of rollers mounted adjacent to one another on said first support, each of said rollers having a respective circumferential surface comprising a portion of said support surface, said rollers being rotatable about respective axes which are substantially parallel to the longitudinal axis of said pipe.

30. A device according to claim 21, wherein said first support comprises first and second side walls positioned in spaced relation facing each other, said side walls having respective apertures therethrough in registration with said opening in said collar, said collar being positioned between said side walls, one of said side walls having a retaining surface extending therefrom and engaging said collar thereby capturing said collar between said facing side walls.

31. A device according to claim 30, further comprising a pair of roller bearings rotatably mounted on said first support and positioned between said first and second side walls beneath said collar, said roller bearings engaging and rotatably supporting said collar.

32. A device according to claim 21, further comprising a roller rotatably mounted on said first support and positioned substantially diametrically opposite to said tool relatively to said collar, said roller being rotatable about an axis substantially parallel to said longitudinal axis of said pipe, said roller having a circumferential surface comprising said support surface.

33. A device according to claim 21, further comprising an elongated handle attached to said first support and extending therefrom substantially perpendicularly to said long axis of said pipe, said handle facilitating manual rotation of said device relatively to said pipe.

34. A device according to claim 33, further comprising an elongated jackscrew mounted within said handle and having a long axis substantially perpendicular to said longitudinal axis of said pipe, one end of said jackscrew being positioned proximate to said first support and having said second support mounted thereon, a knob for manually moving said jackscrew toward and away from said first support being positioned at an opposite end of said jackscrew, manually turning said knob effecting motion of said second support toward and away from said first support.

35. A device for performing at least one of a plurality of operations on a pipe, said pipe having a longitudinal axis and an outer circumferential surface, said device comprising:
 a first support having a support surface engageable with the outer circumferential surface of said pipe;
 a collar mounted on said first support, said collar having a circumferential side wall defining an opening oriented and sized to receive said pipe when said pipe engages said first support, said circumferential side wall being engageabie with said outer circumferential surface of said pipe and providing radial reinforcement thereto, said collar being rotatable about an axis of rotation substantially parallel to said longitudinal axis of said pipe;
 a second support positioned in spaced relation to said first support, one of said supports being movable toward and away from the other; and
 at least one tool mounted on said second support and positioned facing said first support, each tool and said pipe being rotatable relatively to one another around said longitudinal axis to effect said operation, each tool being engageable with said outer circumferential surface of said pipe when said pipe is supported on said first support, each tool being independently selected from the group consisting of a grooving surface, a marking surface, a radiusing surface and a chamfering surface, said plurality of operations including forming a circumferential groove around said pipe with said grooving surface, forming a reference mark circumferentially around said pipe with said marking surface, radiusing the outer surface of said pipe with said radiusing surface and chamfering the outer surface of said pipe with said chamfering surface.

36. A device according to claim 35, wherein said first support comprises first and second side walls positioned in spaced relation facing each other, said side walls having respective apertures therethrough in registration with said opening in said collar, said collar being positioned between said side walls, one of said side walls having a retaining surface extending therefrom and engaging said collar thereby capturing said collar between said facing side walls.

37. A device according to claim 36, further comprising a pair of roller bearings rotatably mounted on said first support and positioned between said first and second side walls beneath said collar, said roller bearings engaging and rotatably supporting said collar.

38. A device according to claim 35, further comprising a roller rotatably mounted on said first support and positioned substantially diametrically opposite to said tool relatively to said collar, said roller being rotatable about an axis substantially parallel to said longitudinal axis of said pipe, said roller having a circumferential surface comprising said support surface.

39. A device according to claim 38, further comprising an elongated handle attached to said first support and extending therefrom substantially perpendicularly to said long axis of said pipe, said handle facilitating manual rotation of said device relatively to said pipe.

40. A device according to claim 39, further comprising an elongated jackscrew mounted within said handle and having a long axis substantially perpendicular to said longitudinal axis of said pipe, one end of said jackscrew being positioned proximate to said first support and having said second support mounted thereon, a knob for manually moving said jackscrew toward and away from said first support being positioned at an opposite end of said jackscrew, manually turning said knob effecting motion of said second support toward and away from said first support.

41. A device for performing a plurality of operations substantially concurrently on a pipe, said pipe having a longitudinal axis and an outer circumferential surface, said device comprising:
 a first support having a support surface engageable with the outer circumferential surface of said pipe;
 a collar mounted on said first support, said collar having a circumferential side wall defining an opening oriented and sized to receive said pipe when said pipe engages said first support, said circumferential side wall being engageable with said outer circumferential surface of said pipe and providing radial reinforcement thereto, said collar being rotatable about an axis of rotation substantially parallel to said longitudinal axis of said pipe;
 a second support positioned in spaced relation to said first support, one of said supports being movable toward and away from the other;

a first tool comprising a grooving surface mounted on said second support and positioned facing said first support, said grooving surface being engageable with said outer circumferential surface of said pipe when said pipe is supported on said first support;

a second tool mounted on said second support and positioned facing said first support, said second tool being engageable with said outer circumferential surface of said pipe substantially concurrently with said first tool, said second tool being selected from the group consisting of a marking surface, a radiusing surface, a chamfering surface and a cutting blade, said plurality of operations including forming a circumferential groove around said pipe with said grooving surface, forming a reference mark circumferentially around said pipe with said marking surface, chamfering the outer surface of said pipe with said chamfering surface, radiusing the outer surface of said pipe with said radiusing surface and cutting said pipe with said cutting blade; and said first and said second tools and said pipe being rotatable relatively to one another around said longitudinal axis to effect said plurality of operations.

42. A device according to claim 41, further comprising a roller rotatably mounted on said first support and positioned substantially diametrically opposite to said tool relatively to said collar, said roller being rotatable about an axis substantially parallel to said longitudinal axis of said pipe, said roller having a circumferential surface comprising said support surface.

* * * * *